(No Model.) 3 Sheets—Sheet 1.
H. B. COBB.
UNDERGROUND CONDUIT FOR ELECTRIC WIRES.
No. 429,307. Patented June 3, 1890.
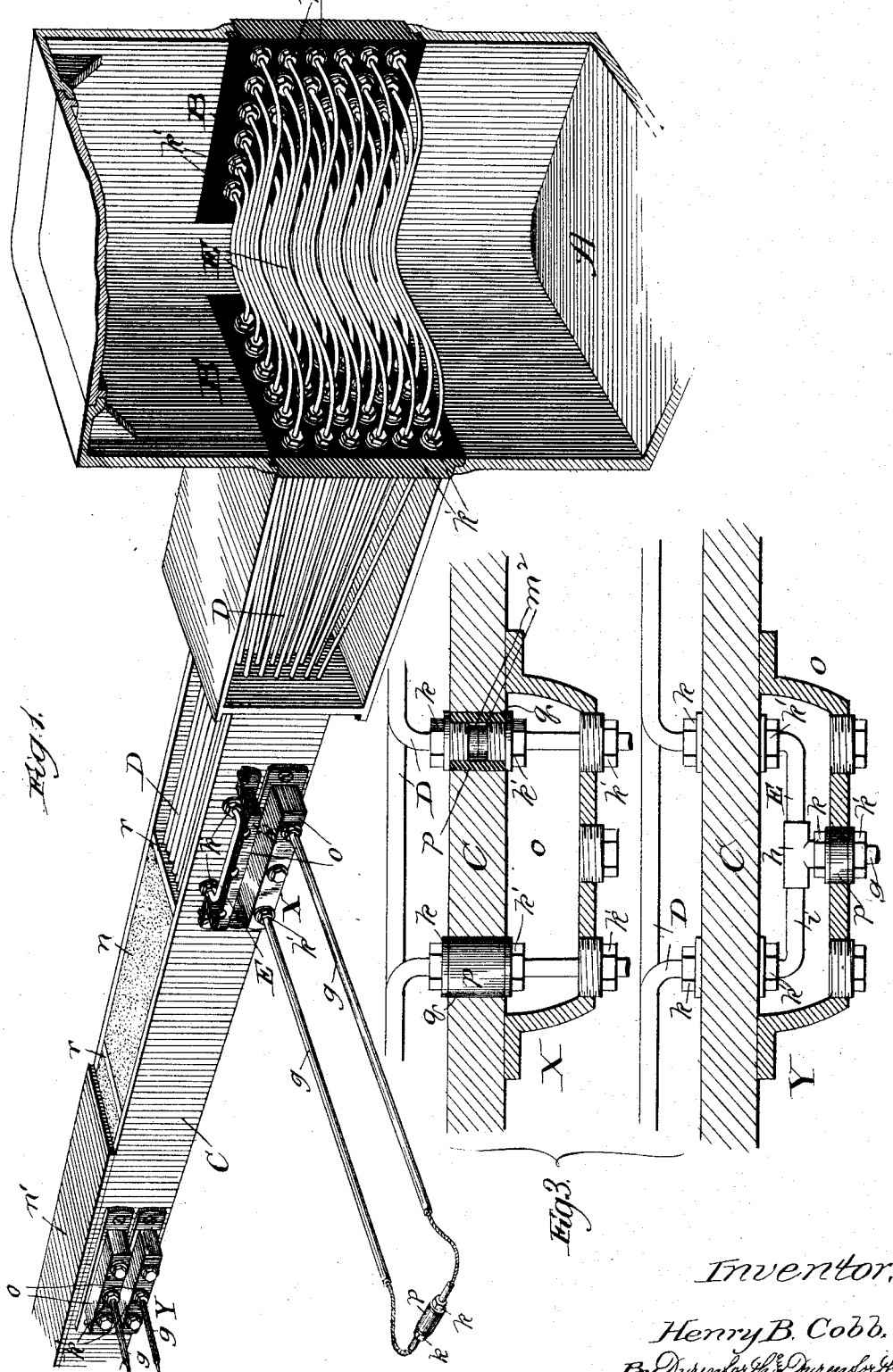
Witnesses:
Inventor:
Henry B. Cobb.

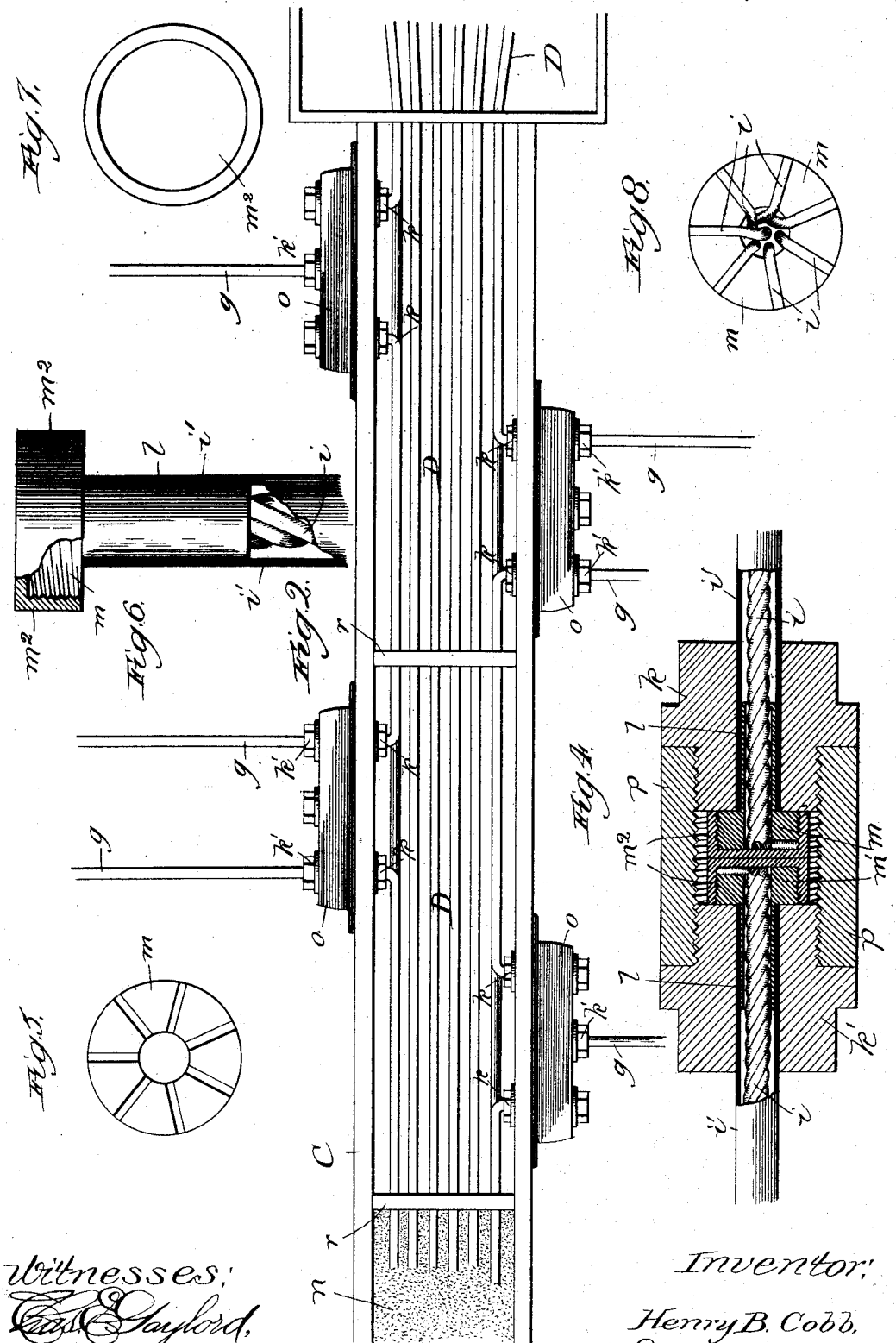

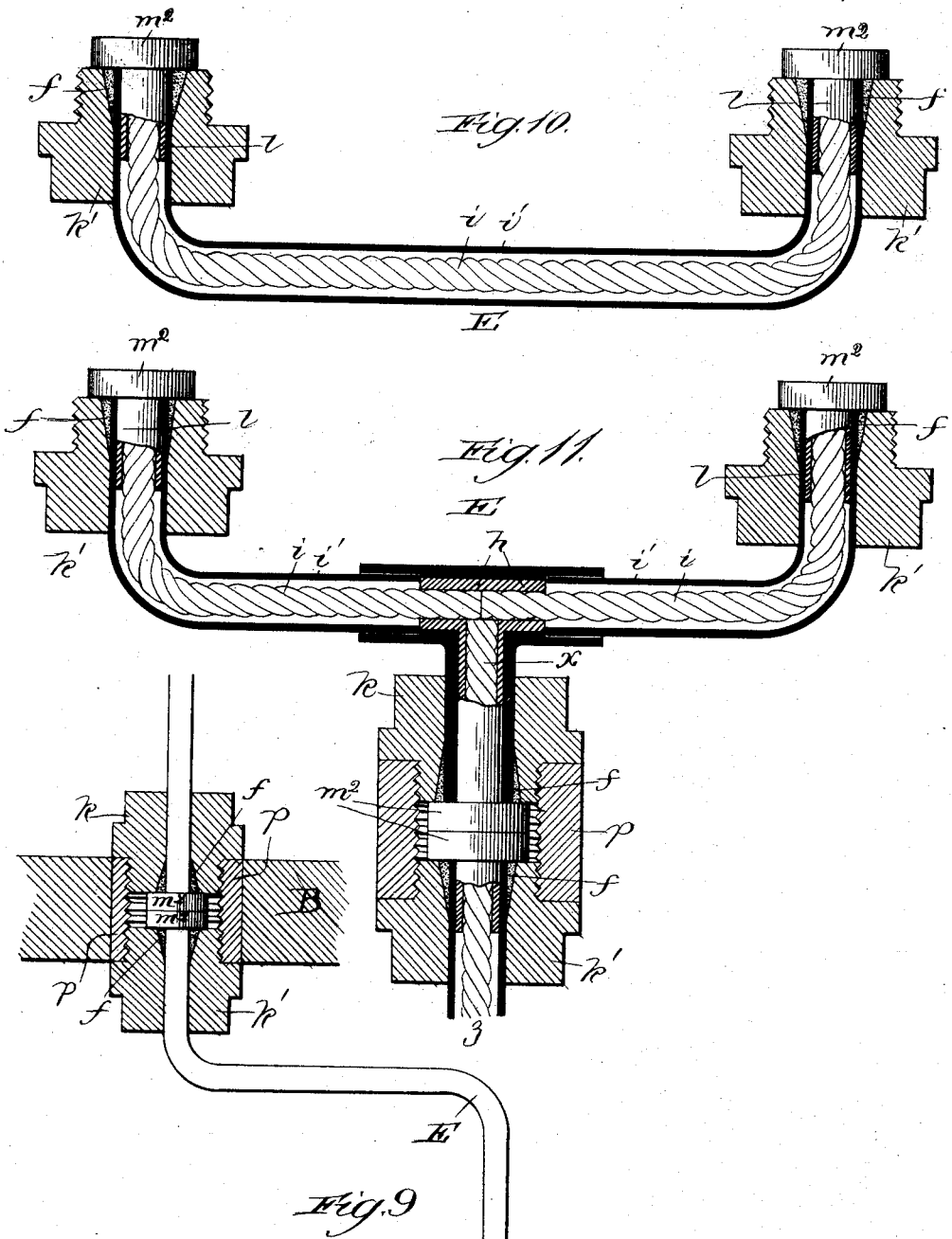

UNITED STATES PATENT OFFICE.

HENRY B. COBB, OF WILMINGTON, DELAWARE, ASSIGNOR TO THE COBB VULCANITE WIRE COMPANY, OF DELAWARE.

UNDERGROUND CONDUIT FOR ELECTRIC WIRES.

SPECIFICATION forming part of Letters Patent No. 429,307, dated June 3, 1890.

Application filed November 8, 1889. Serial No. 329,619. (No model.)

*To all whom it may concern:*

Be it known that I, HENRY B. COBB, a citizen of the United States, residing at Wilmington, in the county of New Castle and State of Delaware, have invented a new and useful Improvement in Systems of Underground Lines of Electric Wires, of which the following is a specification.

My invention relates more especially to the construction and arrangement of a conduit for subterranean use and the electric conductors for which it is provided.

It may here be mentioned that certain details of my improvement are not necessarily limited to use with an underground system of electric wires, and that I do not, therefore, wish to be understood as limiting the same to said particular application. The details referred to will hereinafter be more particularly pointed out.

The prime object of my invention in its particular relation to underground purposes is to provide a conduit (meaning thereby not only the containing-box, but all of its appurtenances, including the man-holes and their contents) which, after having once been placed by burying it in the ground, as along a street, need not thereafter be disturbed for access to the conductors it contains for tapping or using them, and whereby even necessity for excavating the ground to make house-connections need then never be required.

Further objects of my invention are to afford means for the ready distribution of the wires at desired points along the line of the conduit, to avoid the possibility of the accumulation and flow between man-holes of gas and of the consequent explosion thereof, and to provide in each man-hole means for permitting connection, disconnection, and changing of the circuits for the various purposes of such manipulations.

In the accompanying drawings, Figure 1 is a view in perspective illustrating my improved system. Fig. 2 is a partly-broken plan view illustrating the conduit portion proper of the same, the top of the conduit-box being removed. Fig. 3 is a broken sectional plan view illustration the manner of looping the conductors contained in the conduit-box; Fig. 4, a longitudinal sectional view of the coupling-joint. Figs. 5, 6, 7, and 8 are detail views of the coupling; Fig. 9, a sectional view of the coupling in the form adapting it for man-hole use, and illustrating the general construction of the joint by a modified form of that presented in Fig. 4; and Figs. 10 and 11 show further modifications in section of the coupling-joint.

Following is a description of my improved system in all its details, affording, so far as I am at present aware, the best construction for the purpose.

A is a man-hole, which may, generally speaking, involve any well-known or suitable construction. In each of four sides of the man-hole I provide, preferably countersunk into its wall, as shown, a plate B, of insulating material, hard rubber being considered most advantageous for my purpose. The plates B are provided with perforations sufficiently large to receive the coupling ends of the wires, (or insulated wires, or mere tubes of insulating material, preferably hard rubber, if the conductors are to be drawn after the placing of the conduit.)

C is the conduit-box, of suitable material, (preferably wood, though other material, including metal, may be used,) extending from man-hole to man-hole.

In the drawings but one man-hole is shown. This will suffice for purposes of illustrating, since the man-holes are all formed alike or substantially alike; and it will be understood that between the intervals (as the intersections of streets) at which they are provided the box C extends continuously.

Inside the conduit-box C, which extends between and thus at its ends envelops the openings in the walls containing the plates B, are provided at suitable intervals conductor-supports $r$, which, while they may involve any suitable form, construction, and material, are conveniently formed of blocks, preferably of wood, in the shape of diaphragms provided with numerous perforations to correspond with the plates B.

Within the box C are supported, to extend from man-hole to man-hole, tubes D, of insulating material, as shown, to receive conducting-wires, the perforated diaphragms $r$ affording the intermediate supporting medium, and the plates B that for the ends, which extend, by preference, only part way through the perforations in the said plates, being provided at their extremities with means, constituting an important feature of my improvement and hereinafter described in detail, for coupling them within the man-holes. The tubes D within the conduit C are arranged, with those designed for trunk-lines, along the central portion of the box, while those to be tapped at more frequent intervals and affording the distributing-lines are near the sides thereof.

In place of the tubes made entirely of insulating material I may employ lead-covered insulating-tubing or the like, or I may in place of tubing in some cases use wire insulated in any of the usual ways. I generally prefer the insulating-tubing, however, which permits the withdrawal or insertion of the conducting-wire without disturbing the permanent insulation provided for the wire when introduced into the conduit. This is an important feature of my invention.

At desired intervals (as at each house along the route of the conduit to be supplied with current) the box C is provided in its side or sides with apertures $q$, which may be properly insulated internally—as by means of suitable lengths of insulating (hard-rubber) tubing in the form of a sleeve or ferrule $p$. (See Fig. 3.) Two such apertures are provided at each point of distribution, and should be in line with each other longitudinally of the box C, two such sets of two apertures each being so provided, one set below the other in the side of the box, as represented in Fig. 1. The tubing between a pair of man-holes, (or other form, as suggested, of line in the box C,) through which to supply current to points (houses) along the route, is severed or terminates at each set of the apertures $q$, through which it is desired to lead it, being there looped out to extend to the point to which the supply of current is to be directed or, under circumstances hereinafter mentioned, merely coupled together, but outside the box C.

In laying the conduit, to avoid disturbing it afterward and any necessity for excavating the ground whenever possible, I loop the line (tube or wire) for carrying the particular kind of current directly to the desired point, and there couple the ends together by means of my improved removable and adjustable coupling E. Where this is not permitted, the line from which the distribution is to take place is looped at its severed or separated ends through the respective apertures $q$ in the side of the box C and outside of the latter coupled together by means of my improved coupling E. To protect these couplings, shields $o$ (the upper of which in Fig. 1 are shown to have portions removed to display the couplings E inclosed by them) are secured over them, being provided with apertures, as shown, (to be plugged when not in use,) to coincide with the respective apertures $q$, and each also with a central aperture for the passage of a line of an incandescent circuit from the center of a coupling E to another similar line. Of course, where the lines may not be looped in the original placing of the conduit directly to the points of distribution, the advantage of subsequently being able to make the necessary house or analogous connections without street-excavation is lacking. When the box C has been laid, I fill it with a suitable material, (such as sand $n$,) which thus envelops the lines D permanently supported therein, thereby excluding air, gas, and water from the interior, preventing the accumulation of gas and its flowing between man-holes, with the consequent liability to explosion, and also, by excluding air and water, preventing at least material rotting of the box C if formed of wood or the like, or injury thereto by oxidation if formed of metal. After filling the box C it should be closed by means of a permanent cover $n'$. Each aperture $q$ in the box C, or rather the section of tubing or ferrule $p$ therein, Fig. 4, is threaded internally, thereby forming the female portion of the coupling E. At the adjacent ends of each severed line D, where it is looped through apertures $q$ in the box C, it is provided at each of its two extremities, which reach only part way through the apertures, with a head $m$, of metal, (copper,) preferably of disk shape, firmly secured to the extremity of the metal conductor. The manner of securing the head to the conductor, particularly if the latter be composed of twisted strands of wire, as shown, is to extend a metal (copper) ferrule $l$, Fig. 6, from one face of the disk-shaped head $m$, and from around a central opening therein, and to slip the ferrule over the twisted conductor sufficiently far to cause the end of the latter to protrude beyond the face of the head $m$, which is there provided with a series of radial grooves, as represented in Fig. 5, into each of which a strand of the conductor is then bent. With the construction of head $m$ thus described it may be, and preferably is, covered by a cap $m^2$, of metal, (copper,) screwed into place on the head, and which may, if desired, be plated with non-oxidizable metal, as with gold. For convenience in illustration I have shown in most places in the drawings the caps $m^2$ in use on the heads $m\ m'$, so that in such cases the heads proper are not visible. Wherever the cap $m^2$ is shown, however, it will be understood to cover head $m$ or $m'$. The conductor in each line D is also provided at each end, which extends into a man-hole A, with a similar head $m$, protruding part way through (to the middle of) its aperture in the insulating-plate B, each aperture into which is internally threaded, the same as each ferrule $p$ or aperture $q$ in the side of the box C, the plate B then practically affording a ferrule of each internally-threaded aperture it contains. Whenever a line D enters its ferrule, whether in a plate B, in a side of the box C, or elsewhere, it is secured by means of a nut $k$ surrounding it, and the male portion of which screws into the ferrule, the nut being insulated or formed of insulating material, such as hard rubber. Wherever a line D is looped in the manner described out of a side of the box C at points of distribution where it is not permitted to lead it into the place or house to be supplied with current, the disconnected ends of the line are coupled together by means, Fig. 10, of a section of insulated wire (preferably wire $i$, inclosed in hard-rubber tubing $i'$) carrying at each end a head $m'$, formed as a counterpart of the head $m$, and which may thus be merely the metal disk, such as that already described, or the capped disk, also described, and a nut $k'$, like the nut $k$, is provided at each end of the insulated section, as shown, to enter the respective ferrule $p$ or aperture $q$, and thus secure the coupling-section in place with the opposing or contact surfaces of the heads $m$ and $m'$ pressed against each other. This particular apparatus is illustrated at X in Fig. 1.

The increased extent of contact-surfaces afforded by the contiguous heads $m$ and $m'$ over an extent of surface equaling or substantially equaling the circumference of the ends of the wires is particularly advantageous as preventing any increase in resistance at the joints even if the heads be not in close contact throughout their entire opposing surfaces, the effect being rather to decrease than to increase the resistance at the joints. As already stated, the loop coupled in the manner described should be protected against injury by means of a metal shield $o$.

Where a line D, carrying an incandescent current, requires to be looped out of the box C under the conditions just described, connecting means, as shown in Fig. 10, are employed until the house-connection is eventually made, when the means are employed shown in Fig. 11, comprising a section of wire $i$ in the insulation $i'$ and provided at its extremities with the heads $m'$ and nuts $k'$, all thus far involving the construction already described with reference to Fig. 10 and applied to the threaded apertures $q$ in the manner explained, but, of course, to those of different lines D, as represented at Y in Figs. 1 and 3. The coupling means for the incandescent-current line is further provided between its extremities with a metal (copper) T $h$, comprising a hollow head surrounding and in direct contact with the wire $i$, and extended, as to its shank portion $x$, as a solid metal stem, carrying at its extremity a head $m$, the T $h$ being covered, like the wire $i$, with insulating material $i'$, (preferably hard-rubber tubing). The stem $x$ passes through the central orifice with which the respective shield $o$ is shown to be provided, and to lead the line into a house it is coupled at the stem $x$ by an internally-threaded ferrule $p$, enveloping the head $m$ of the stem to a length $z$ of the wire to be led into the house, and having a head $m$ at its end inserted into the ferrule $p$ into contact with the head $m$ on the end of the stem $x$, the two heads being secured together by means of nuts $k$ and $k'$, of insulating material, like all the said nuts employed. It will be noticed that the openings through the nuts $k$ and $k'$ widen toward the ends nearest the heads $m$ and $m'$. This permits the introduction around the tubing within the nuts of a cement $f$—such as Chatterton's compound—which serves to render the joints quite impervious to air and moisture. The cement is introduced in a warm fluid state, and the adjacent parts of the joint are preferably also warm. The screwing up of the nuts serves to force the cement around the tube, and when the parts are allowed to cool a firm joint is produced, which cannot be easily disturbed until heat be applied sufficient to soften the cement.

Where it is possible to lead a line D to a point along the route of the conduit to be supplied with current at the time of burying the conduit, this is done to afford the provision for lighting, &c., analogous to that in the case of the well-known and common manner of providing facilities for introducing gas and water into houses. This I do by leading the severed ends of the respective line or lines D through metal tubes $g$, as shown in Fig. 1, into the respective house or houses, the ends being joined by means of my improved coupling E, constructed like that shown in Fig. 4, and involving the heads on the separated ends of the wires clamped together inside the ferrule $p$ by means of the nuts.

Inside each man-hole A the various lines are connected together from one plate B to another by coupling means like that illustrated in Fig. 9, and involving identically the same construction as the device illustrated in Fig. 10, the only exception, if any, being that the section of insulated wire may be bent to convenient angles.

My improved coupling means thus described is not limited in its use to underground systems, but is intended to be included in my claim for all connecting purposes to which it is applicable in electric circuits; but one manner of securing the terminal heads $m$ and $m'$ to their respective conducting-wires is herein definitely described. I do not, however, wish to be understood as limiting my improvement to any particular manner of securing them; nor do I wish to be understood, in any sense, as limiting my improvement to the various details of construction involved therein, as herein shown and described, since they may be variously modified without thereby departing from the spirit of my invention. The lines D in the box C, to cite one instance of variation, may, or some of them may, be coated or covered with metal, especially those for telephone and telegraph currents.

What I claim as new, and desire to secure by Letters Patent, is—

1. In an electric underground system, the combination of a conduit-box extending between man-holes and having any desired num- of flexible tubes of insulating material supported within it and extending from man-hole to man-hole, substantially as described.

2. In an electric underground system, the combination of a conduit-box extending between man-holes and having supported within it any desired number of flexible tubes of insulating material extending from man-hole to man-hole, and loops extending at desired intervals from the tubes through the conduit-box for distribution along its route, substantially as described.

3. In an electric underground system, the combination of a conduit-box extending between man-holes, any desired number of insulated conductors extending from man-hole to man-hole inside the said conduit-box, permanently-insulated loops extending at desired intervals from the insulated wires through the conduit for distribution along its route, and removably-adjustable couplings for the said loops outside the said conduit-box, substantially as described.

4. In an electric underground system, the combination of a conduit-box C, extending between man-holes and having supported within it any desired number of flexible tubes of insulating material extending from man-hole to man-hole, and filling $n$ of sand or the like in the conduit-box, substantially as described.

5. In an electric underground system, the combination of man-holes A, each containing at different sides perforated insulated plates B, and a conduit-box C, extending between man-holes and having any desired number of tubes of insulating material extending within it from man-hole to man-hole, with their opposite ends projecting part way through the perforations in respective adjacent plates B, and detachable insulators entering the perforations in the plate B from the man-holes, substantially as described.

6. In an electric underground system, the conduit-box C, extending between man-holes and provided at intervals with lateral openings $q$, and having extended within it from man-hole to man-hole any desired number of flexible tubes of insulating material severed at and extending at adjacent severed extremities into said openings, and detachable insulators entering said openings from the opposite side, substantially as described.

7. In an electric underground system, the combination of man-holes A, each containing in different sides perforated insulating-plates B, a conduit-box C, provided at intervals with lateral openings $q$, and tubes of insulating material extended within the box from man-hole to man-hole, with their opposite ends projecting part way through the perforations in respectively adjacent plates B, said tubes being severed at points adjacent to openings $q$ in the box and extended into said openings, and detachable insulators entering said openings from the opposite side, substantially as described.

8. An insulated electric conductor formed in sections having adjacent ends provided with metallic heads, a threaded insulating-ferrule enveloping the said heads, and nuts made of insulating material engaging with and entering the ferrule at its opposite ends and holding the heads in contact with each other within it, substantially as described.

9. An insulated electric conductor formed in sections having adjacent ends provided with metallic heads, a threaded insulating-ferrule enveloping the said heads, nuts engaging with the ferrule at its opposite ends and holding the heads in contact with each other within it, and a cement filling surrounding the insulated conductor within the nuts, substantially as described.

10. An insulated electric conductor formed in sections, a metal head on a metallic ferrule secured around the conductor toward each end inside its insulating-covering, a threaded insulating-ferrule enveloping the said heads, and nuts engaging with the ferrule at its opposite ends and holding the heads in contact with each other within it, substantially as described.

11. An insulated electric conductor formed in sections having adjacent ends provided with metallic disk-shaped heads covered with metal caps, a threaded insulating-ferrule enveloping the said capped heads, and nuts engaging with the ferrule at its opposite ends and holding the caps in contact with each other, substantially as described.

12. In an electric underground system, the combination of man-holes A, provided in different sides with perforated insulating-plates B, a conduit-box C, extending between man-holes and supporting within it any desired number of insulated conducting-wires terminating at opposite ends in metallic heads extending into the respectively adjacent perforated plates B, and insulated couplings E, provided at their opposite ends with metallic heads and affording means for connecting within the man-holes conductors from different conduits, substantially as and for the purposes set forth.

13. In an electric underground system, the combination of man-holes A, provided in different sides with insulating-plates B, having internally-threaded perforations, a conduit-box C, extending between man-holes and supporting within it any desired number of insulated conducting-wires terminating at opposite ends in metallic heads extending into the threaded perforations in the respectively adjacent plates B and secured therein by nuts and insulated couplings E, for use in the man-holes, provided at their opposite ends with metallic heads and with insulating-nuts for holding the said heads of the coupling against those at the ends of conductors in different conduits, substantially as and for the purpose set forth.

14. In an electric underground system, the combination of man-holes A, provided in different sides with insulating-plates B, having internally-threaded perforations, conduit-boxes C, extending between man-holes and each supporting within it any desired number of insulated conducting-wires terminating at opposite ends in metallic heads extending into the threaded perforations in the respectively adjacent plates B, and a coupling for use within man-holes for connecting wires leading therefrom to different conduit-boxes, comprising a section of insulated wire provided at opposite ends with metallic heads to fit into the threaded perforations in plate B, and provided toward each end with a nut for securing the coupling in the said threaded perforations, substantially as described.

15. In an electric underground system, the combination of man-holes A, a conduit-box C, provided at intervals with perforations $q$ and extending between man-holes, any desired number of insulated conducting-wires supported in the box C to extend at opposite ends into the man-holes and severed in desired number at points adjacent to the said perforations $q$, metallic heads secured to the said severed ends and extended into the said perforations, and an insulated coupling for each severed conductor connecting the said ends together outside the box C, substantially as described.

16. In an electric underground system, the combination of man-holes A, a conduit-box C, provided at intervals laterally with internally-threaded perforations $q$ and extending between man-holes, any desired number of insulated conducting-wires supported in the box C to extend at opposite ends into the man-holes and severed in desired number at points adjacent to the said perforations $q$, metallic heads secured to the said severed ends and extended into the said perforations, nuts for securing the said headed ends in place, and a coupling E for the severed wire, having a section of insulated conducting-wire provided at each end with a metal head to fit against the heads on the ends of the severed conductor and provided toward opposite ends with nuts, substantially as described.

17. In an electric underground system, the combination of man-holes A, provided in different sides with insulating-plates B, having internally-threaded perforations, conduit-boxes C, provided at intervals laterally with internally-threaded perforations $q$ and extending between man-holes, any desired number of insulated conducting-wires supported in said box C and extending at opposite ends, provided with metallic heads, into the threaded perforations of plates B, and severed in desired number at points adjacent to the said perforations $q$, metallic heads secured to the said severed ends and extended into the said lateral perforations, a coupling for use within the man-holes for connecting wires leading therefrom to different conduit-boxes, comprising a section of insulated wire provided at opposite ends with metallic heads to fit into threaded perforations in plates B and provided toward each end with a nut for securing the coupling in the said threaded perforations of the plates B, and a coupling for connecting the said severed wire, having a section of insulated conducting-wire provided at each end with a metallic head to fit into the perforations $q$ against the heads of the severed conductor and provided toward opposite ends with nuts, substantially as described.

18. In an underground system, the combination of a conduit-box C, extending between man-holes and provided at intervals with lateral openings $q$, any desired number of insulated conductors extending from man-hole to man-hole in the conduit-box and severed and extending at adjacent severed extremities into the openings $q$, removably-adjustable couplings E, connecting the severed ends of conductors outside the conduit-box at said openings, and shields $o$, secured over said openings outside the conduit-box, substantially as described.

19. In a joint for the severed ends of a conductor formed each with several wires, the heads $m$ $m'$, of conducting material, secured to the adjacent ends of the said severed wires, and having each the central aperture and the radial grooves to receive the wires, and means, substantially as described, for holding the said heads separably in contact with each other, substantially as set forth.

In witness whereof I have hereunto subscribed my name in the presence of two witnesses.

HENRY B. COBB.

Witnesses:
DOUGLAS DYRENFORTH,
BRUCE S. ELLIOTT.